D. COUNCIL.
WARMING OR COOKING ATTACHMENT FOR GRATES.
APPLICATION FILED MAR. 1, 1912.
1,088,542.
Patented Feb. 24, 1914.
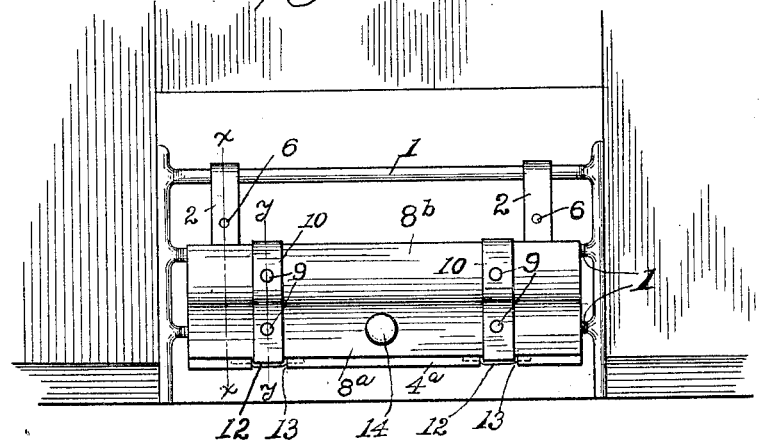
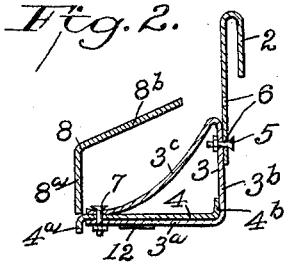
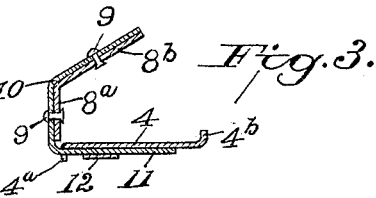
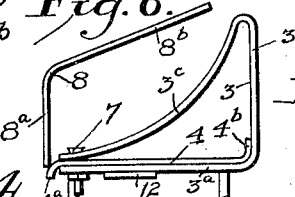
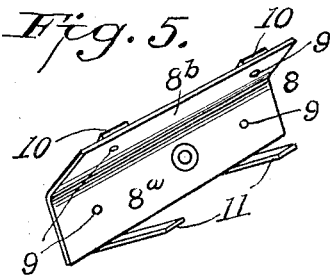
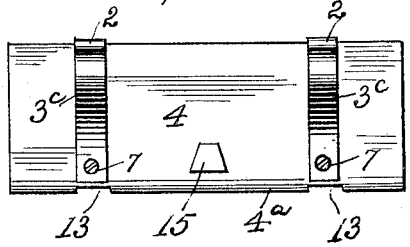
Witnesses
Allan Hobson
M. E. Shook
Inventor
Dee Council,
By Edson Bros,
Attorneys.

UNITED STATES PATENT OFFICE.

DEE COUNCIL, OF RIVES, TENNESSEE, ASSIGNOR OF ONE-HALF TO DAVID C. COUNCIL.

WARMING OR COOKING ATTACHMENT FOR GRATES.

1,088,542.  Specification of Letters Patent.  Patented Feb. 24, 1914.

Application filed March 1, 1912. Serial No. 680,943.

*To all whom it may concern:*

Be it known that I, DEE COUNCIL, a citizen of the United States, residing at Rives, in the county of Obion and State of Tennessee, have invented certain new and useful Improvements in Warming or Cooking Attachments for Grates; and I do hereby declare the following to be a full, clear, and exact description of the invention, such as will enable others skilled in the art to which it appertains to make and use the same.

My invention relates to heating or cooking attachments for grates.

It is my aim to provide a simple device adapted to be quickly arranged in juxtaposition to a grate for warming sad irons, cooking food, heating water, etc.

One object of the invention is to provide a cover or housing, for the heating attachment, which may be removed without dislodging said attachment from its position near to the grate.

Another object is to produce an attachment of the kind described which may be adjusted to fit grates of different heights.

Further objects will become apparent from the following description.

The invention consists of a platform having means for supporting it in juxtaposition to the grate, and a cover or housing removably attached to said platform and adapted to close the front and top of the heating compartment, leaving the rear thereof open to the heat from the fire in the grate.

The invention also consists in the features of construction and combinations of parts hereinafter described, illustrated in the accompanying drawing and specified in the appended claims.

In the accompanying drawing illustrating the preferred embodiment of my invention: Figure 1 is an elevation of a grate with my heating attachment adjusted thereto. Fig. 2 is a sectional view of the adjustment taken on the line $x$—$x$ of Fig. 1. Fig. 3 is a sectional view taken on the line $y$—$y$ of Fig. 1, the parts 2 and 3, however, being omitted. Fig. 4 is a plan view of the platform alone, and Fig. 5 is a perspective view of the removable cover for said platform. Fig. 6 is a view in edge elevation of another embodiment of the invention.

Referring more particularly to the drawing, 1 designates the bars of a grate from the upper one of which my attachment is supported by means of hooks 2. Said hooks are adjustably secured to brackets 3 mounted on the platform 4. The adjustment is effected by passing the bolt 5, which secures the hook to the bracket, through one of a series of perforations 6 in the former. While I have only shown two of these perforations in each hook, it will be understood that more may be formed therein, allowing for a greater range of adjustment, if desired. The brackets are preferably each formed of a bent strip of metal having a horizontal portion $3^a$ extending below the platform 4, a vertical portion $3^b$ extending upwardly at the rear edge of said platform, and an inclined portion $3^c$ extending downwardly from the upper end of the vertical portion and terminating on the upper surface of said platform above the forward end of the horizontal portion. Said brackets are secured to the platform by bolts 7, or any other suitable means, passed through the extremities of the bent strips and also through the platform near the front edge of the same. The front margin of the platform is preferably turned down, as at $4^a$, to facilitate the placing thereon of articles to be heated. The rear margin of said platform is preferably turned up, as at $4^b$, to form a rim which prevents the articles from being accidentally pushed off into the fire.

The cover 8, for the platform, preferably comprises a piece of sheet metal bent longitudinally to form a vertical front portion $8^a$ and an upwardly and rearwardly inclined portion $8^b$. To this plate there are secured in any suitable manner, such as by rivets 9, two metal strips 10 having their lower ends extending inward horizontally from the lower edge of said plate forming tongues 11 adapted to fit loops 12 on the under surface of the platform. When said tongues are engaged with said loops, they support the cover in the position illustrated in Figs. 1, 2 and 3. Notches 13 are cut in the downwardly bent front margin of the platform to permit the tongues 11 to fit close up against the under surface of said platform in order that the cover may be retained firmly in place. The cover is provided with a handle or knob 14 which may be grasped for conveniently removing it from the platform and for setting it in place thereon.

The platform has a perforation or slot 15 cut near its front edge and about midway of its ends for engagement by a stove lifter for removing it from a grate and for placing it in position.

As illustrated in Fig. 6, the platform may be provided with legs 16 for supporting it in position. These legs may be used to supplement hooks or hangers 2, or may be used exclusively for supporting said platform, the hooks being omitted.

It will be noted that the shape of the cover is such that the heat from the fire in the grate will enter the inclosed or housed space above the platform and escape along the upwardly and rearwardly inclined portion 8ᵇ back into the fireplace, thus utilizing the heat to the fullest extent for the purpose of warming or cooking that which is placed upon the platform.

It will be understood that I do not limit myself to the exact details of construction illustrated and described herein but reserve the right to make such changes as fairly fall within the scope of my invention.

I claim:

1. In a device of the character described, the combination with a platform and means for supporting it from a grate, of a removable cover adapted to house a space above the platform, said cover including a vertical portion extending upwardly from the platform, and a member extending rearwardly under said platform to provide for removably attaching said cover to said platform.

2. In a device of the character described, the combination with a platform and means for supporting it from a grate, of a removable cover adapted to house a space above the platform, said cover including a vertical portion extending upwardly from the platform, and an inclined portion in continuation thereof extending upwardly and rearwardly above said platform and means for removably attaching said cover to said platform, including rearwardly extending members, said platform having keepers upon its underside to receive said rearwardly extending members.

3. In a device of the character described, the combination with a platform and means for supporting it in juxtaposition to a grate, of a removable cover adapted to house a space above the platform, loops on said platform, and tongues projecting rearwardly from said cover adapted to fit said loops for supporting the cover in position.

4. In a device of the character described, the combination with a platform, of brackets, each having a horizontal portion extending below the platform, a vertical portion extending above the platform, and an inclined portion terminating on the upper surface of the platform above the end of said horizontal portion, securing means passed through said ends of the brackets and also through said platform, and means attached to said brackets for supporting the platform in juxtaposition to a grate.

5. In a device of the character described, the combination with a platform, means for supporting the same in juxtaposition to a grate, of a removable cover adapted to be secured to the platform, said cover comprising a single sheet of material bent to form a substantially vertical portion and a horizontally inclined portion to house a space above the platform.

In testimony whereof, I affix my signature, in presence of two witnesses.

DEE COUNCIL.

Witnesses:
EDGAR E. SHORE,
COTHON BONNER.